United States Patent
Fauh et al.

(10) Patent No.: US 7,038,522 B2
(45) Date of Patent: May 2, 2006

(54) SYSTEM AND METHOD FOR REDUNDANT POWER SUPPLY CONNECTION

(75) Inventors: Jean-Francois Fauh, Vence (FR); Arnault Fontebride, Antibes (FR); Denis Roman, La Turbie (FR)

(73) Assignee: International Business Machines Corporation, Armonk, NY (US)

( * ) Notice: Subject to any disclaimer, the term of this patent is extended or adjusted under 35 U.S.C. 154(b) by 554 days.

(21) Appl. No.: 10/290,219

(22) Filed: Nov. 6, 2002

(65) Prior Publication Data
US 2003/0090158 A1    May 15, 2003

(30) Foreign Application Priority Data
Nov. 13, 2001  (EP)  ................................. 01480111

(51) Int. Cl.
*H03K 17/00*    (2006.01)
(52) U.S. Cl. .................. 327/407; 327/408; 307/87; 307/80
(58) Field of Classification Search .......... 307/85, 307/86, 87, 138, 64, 65, 80, 115, 130
See application file for complete search history.

(56) References Cited
U.S. PATENT DOCUMENTS

| | | | | |
|---|---|---|---|---|
| 4,734,844 A | * | 3/1988 | Rhoads | 363/72 |
| 4,812,672 A | * | 3/1989 | Cowan et al. | 307/64 |
| 5,426,386 A | * | 6/1995 | Matthews et al. | 327/63 |
| 5,519,557 A | * | 5/1996 | Kopera et al. | 361/84 |
| 5,598,041 A | * | 1/1997 | Willis | 307/80 |
| 5,811,895 A | * | 9/1998 | Suzuki et al. | 307/125 |
| 5,828,140 A | * | 10/1998 | Shih | 307/30 |
| 6,144,115 A | * | 11/2000 | Massie et al. | 307/81 |

* cited by examiner

*Primary Examiner*—Brian Sircus
*Assistant Examiner*—Andrew Deschere
(74) *Attorney, Agent, or Firm*—James J. Cioffi

(57) ABSTRACT

A system for connecting a receiver to a redundant power supply. The power supply units are connected to the receiver by means of a pair of control switches, each being connected in series between one of the power units and the receiver, and each having its intrinsic diode forwardly biased between the power unit and the receiver. A voltage comparator senses which of the power supply units is having the higher potential difference between its high and low potential terminals. The output of the comparator controls the gate of both control switches such that the control switch in series with the sensed power supply unit is conducting while the other one is off. When a reversed polarity is applied to the receiver, the receiver is protected by the intrinsic diode. When at least one of the power supplies is connected with the correct polarity, the receiver is supplied without an appreciable voltage drop and with the lowest possible power losses.

18 Claims, 3 Drawing Sheets

SYSTEM AND METHOD FOR REDUNDANT POWER SUPPLY CONNECTION

FIELD OF THE INVENTION

The present invention relates to a system for connecting redundant power supplies.

BACKGROUND OF THE INVENTION

Current sources which are non-interruptible commonly have two redundant D.C. power sources connected by means of relay or solid state switches to a single receiver. If one of the power supplies fail, the receiver can be carried out by the other power supply. In many applications where redundant power supplies are used, it is desirable to protect the receiver against reversed polarity of the power supply. Moreover, it is also desirable to dynamically switch the receiver from one power supply to the other, and to limit the current variation when the receiver is being connected to the power supply or being disconnected from it.

Typical redundant power supply solutions commonly use a forward biased diode per power supply in one or both of the higher and lower potential lines. These diodes serve to avoid short circuits between power supplies and to protect the receiver from reversed polarity. However, because of the voltage drop across the diode in its forward conducting direction, these diodes reduce the global efficiency of the circuit.

Proposals have been made by others to use relays or solid state switches in redundant power supply applications, and particularly, solutions having metal oxide semiconductor field effect transistor (MOSFET) devices connected to a parasitic or integral diode such that the current is only flowing from power supply to receiver. Willis U.S. Pat. No. 5,598,041, the disclosure of which is incorporated by reference herein, discloses an implementation where the MOSFET device must provide a conduction path through its drain-to-source resistance 'Ron' when the power supply polarity is reversed. The MOSFET device provides a conduction path between both power supplies which will damage the power supplies. The device is thus not able to limit the current variation at the receiver power-on, during connection or during disconnection.

BRIEF SUMMARY OF THE INVENTION

It is a purpose of the present invention to provide a connection device adapted to connect redundant power supplies to a receiving unit and having a reverse polarity protection function which eliminates the risk of short circuits between the power supplies.

It is another purpose of the present invention to provide a connection device having current limitation capability at the connection or disconnection of the receiving unit.

It is yet another purpose of the present invention to provide a connection device which is effective in terms of power losses by having a limited voltage drop between the power supplies and the receiving unit.

These purposes are achieved in a preferred embodiment by a system for connecting a receiving unit to redundant power supply units, in which the power supply units are connected to the receiving unit by means of a pair of control switches, each being connected respectively in series between one of the power supply units and the receiver, and each having an intrinsic diode forwardly biased between the power unit and the receiver. A voltage comparator senses which of the power supply units is having the higher difference in potential between its high and low potential terminals. The output of the comparator controls the gate of both control switches such that the control switch in series with the sensed power supply unit is conducting while the other one is off. When a reversed polarity is applied to the receiving unit, this latter is protected by the intrinsic diode of the control switch. When at least one of the power supply units is connected with the correct polarity, the receiving unit is supplied without an appreciable voltage drop and with the lowest possible power losses.

In a second embodiment of the invention, a pair of isolation switches is connected between each power supply unit and the control switches, each control switch having an intrinsic diode back biased. The gate of each isolation switch is controlled by the output of the voltage comparator. The isolation switches allow the isolation of each power supply unit, one from the other. They are preferably controlled gradually so that they limit the inrush current that may flow from one power supply to the receiver at the power on.

In a third embodiment of the invention, the isolation switches are turned off gradually by a disconnection arrangement receiving a sensing signal issued from the receiver that is being unplugged while the power terminals are still plugged. In this way, fast current variations in harness between the power supply units and the receiver disconnection are eliminated, thereby reducing transient over voltages that may damage receivers and power supplies connected together.

DETAILED DESCRIPTION OF THE INVENTION

In the three illustrated embodiments, it is assumed that each power supply delivers a high voltage and a low voltage, respectively, to a high and low potential line through a high and low voltage terminal. As is usually the case in networking power distribution, the high potential line is common to the several power supplies.

Figure 1:
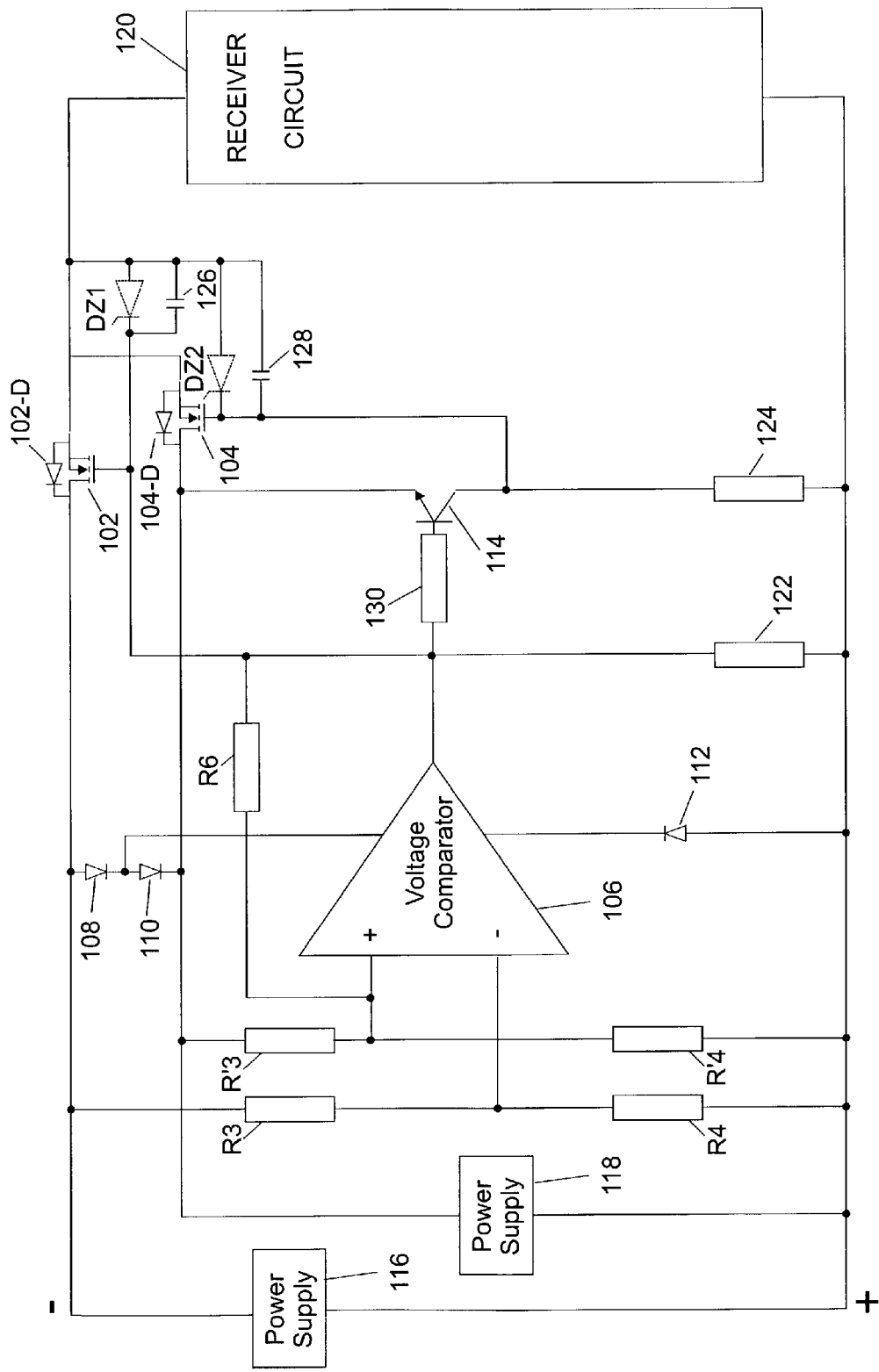
FIG. 1 is a block diagram of a preferred embodiment of a redundant power supply connecting system of the present invention.

Referring now to the drawings, and more particularly to FIG. 1, there is shown a preferred embodiment of a redundant power supply connecting circuit of the present invention. The circuit is made of a pair of control switches 102 and 104, a voltage comparator 106, three diodes 108, 110, 112 and an inverter transistor 114. The control switches are preferably N-channel MOSFET transistors, but the invention could be adapted easily to P-channel transistors as well. As will be appreciated by those skilled in the art, each MOSFET control switch 102, 104 includes an intrinsic diode (also called a parasitic body diode) respectively indicated by 102-D and 104-D on FIG. 1. The drain terminal of first control switch 102 is connected to the low voltage terminal of a first power supply 116 through a first low potential line. The drain terminal of second control switch 104 is connected to the low voltage terminal of a second power supply 118 through a second low potential line. Each source terminal of the control switches is connected to a receiver circuit 120.

The voltage comparator 106 is powered by either power source 116 or 118, whichever has the highest potential difference between its high and low voltage terminals. A pair of diodes (108, 110) is connected in series between the low voltage terminals of the power sources, and the middle point of the diodes is coupled to the voltage comparator to power it. A first input of voltage comparator is connected to the low voltage terminal of first power supply 116, while a second input is connected to the low voltage terminal of second power supply 118.

In an alternate embodiment, a voltage divider made of a resistive path (illustrated by the pair of resistors (R3,R4) and (R'3,R'4)) may be connected to each input of the voltage comparator to adapt the voltage input to the voltage comparator characteristics.

The output of the voltage comparator is connected to the gate of the MOSFET control switch 102 and to the base of inverter 114 through a resistor 130 which limits the current in the base of the inverter 114. The emitter of transistor 114 is connected to the lowest voltage terminal of the two power sources 116 or 118 through the diodes 108 and 110 while its collector is connected to gate of control switch 104.

Two resistors 122, 124 and two capacitors 126 and 128 are arranged to provide a (RC) charge path respectively for each gate of the control switches 102 and 104. Resistor 122 is connected between the gate of switch 102 and the high voltage terminal of the power supplies, while resistor 124 is connected between the gate of switch 104 and the high voltage terminal of the power supplies. Capacitor 126 is connected between the gate and source of switch 102 and capacitor 128 is connected between the gate and source of switch 104.

Additionally, two Zener diodes DZ1 and DZ2 may be respectively connected in parallel to the capacitors 126, 128 to provide a gate protection in case of high supply voltages or surges in the power lines.

In operation, when connecting the first power supply 116 to the receiver circuit while the second power supply 118 is left unconnected, the second input of the comparator will be higher than the first input. The gate voltage of MOSFET control switch 102 is pulled high since the gate voltage of MOSFET control switch 104 is pulled low by the inversion of transistor 114. The gate voltage of both transistors 102 and 104 is selected to be greater than the threshold conduction voltage. The intrinsic diode 102-D of transistor 102 is then by-passed by the drain-to-source resistance 'Ron' of this transistor.

Two cases arise when second power supply 118 is connected. A first case is when the difference in potential between the terminals of the second power supply is lower than the difference in potential between terminals of the first power supply 116. In that case, the voltage at the second input of the comparator is higher than at the first input and the output of the voltage comparator remains high.

The second case is when the difference in potential between the terminals of the second power supply is higher than the difference in potential between terminals of the first power supply. In that case, the output of the voltage comparator goes low, pulling down the gate voltage of control switch 102 and pulling high the gate voltage of control switch 104. Control switch 102 is in a non-conducting state while control switch 104 is closed and its intrinsic diode 104-D prevents first power supply 116 from shorting to second power supply 118.

It will be appreciated by those skilled in the art that the time to turn off one control switch device is shorter than the time to turn on the other one in order to avoid a transient short circuit between power supplies. In fact, the gate of the turned-off control switch is pulled low by saturating the inverter and thus shorting the associated capacitor.

This phenomena is enforced by implementing inverter 114 as a bipolar transistor, as the saturation time of a bipolar transistor is shorter than the de-saturation time. In other words, first and second power supplies are never shorted in steady state as well as during power supply switch over.

In an alternate embodiment, additional storage capacitors may be connected in parallel with the receiving unit to deliver a current to the load during the power supply switch over. However, assuming that the gate of the MOSFET control switch to be conducting is fully enhanced, the voltage drop from supply voltage to the receiver typically is less than 50 mV.

When the second power supply 118 is connected to the receiver with a reversed polarity while the first power supply is connected to the receiver with the direct polarity, then the second input of the voltage comparator is tied to a voltage higher than the first input. The comparator's output enhances the gate of the first control switch 102 thus allowing the current to be sourced from first power supply, while the second control switch 104 is in a non-conducting state. The receiver is thus powered by first power supply 116, and the voltage at the source electrodes of both control switches is more negative. Then the intrinsic diode 104-D of second control switch 104 is back biased and no current is flowing from second power supply 118 to first power supply 116.

When the first and the second power supplies are connected to the receiver circuit with a reversed polarity, then diodes 108, 110, and 112 are back biased and voltage comparator 106 is no longer supplied. Moreover, no current is fed to the inverter 114. The gates of both control switches 102 and 104 are pulled to the lowest potential through resistors 122 and 124, and the gate-to-source voltage of each control switch is below the gate-to-source threshold voltage. Both control switches are thus in a non-conducting state and no current is flowing to the receiver. Furthermore, the intrinsic diode of each control switch isolates each power supply, one from the other.

In an alternate embodiment, shown in FIG. 1, the comparator is a hysteresis voltage comparator that improves the noise immunity of the comparison mechanism. In that case, a resistor R6 provides a feedback from the output of the voltage comparator to the second input. One control switch device switches from a conducting state to a non-conducting state every time a supply voltage becomes greater than the other one. And in case the supply voltages have almost the same value, this phenomena will happen more often. It is not desirable that a control switch switches too frequently because the transistors are equivalent to a resistance in series with the power source during the transition, thereby affecting the efficiency of the system.

To avoid shorts between power supplies, the amplitude of the hysteresis should never exceed the forward voltage across a diode conducting a certain amount of current and typically in the range of 200 to 400 mV. In some applications it may be necessary to use a voltage regulator to supply the comparator and also to protect its inputs from voltages higher and lower than the supply voltage of the comparator. A positive charge pump may also be used to ensure that the MOSFET transistors are fully enhanced. This implementation is not detailed here as a person skilled in the art would easily adapt the invention to such a specific environment.

The preferred embodiment has been described with MOSFET transistors as being easier to control and generating no bounce at switching, however the invention could also employ mechanical or solid state relays.

Figure 2:
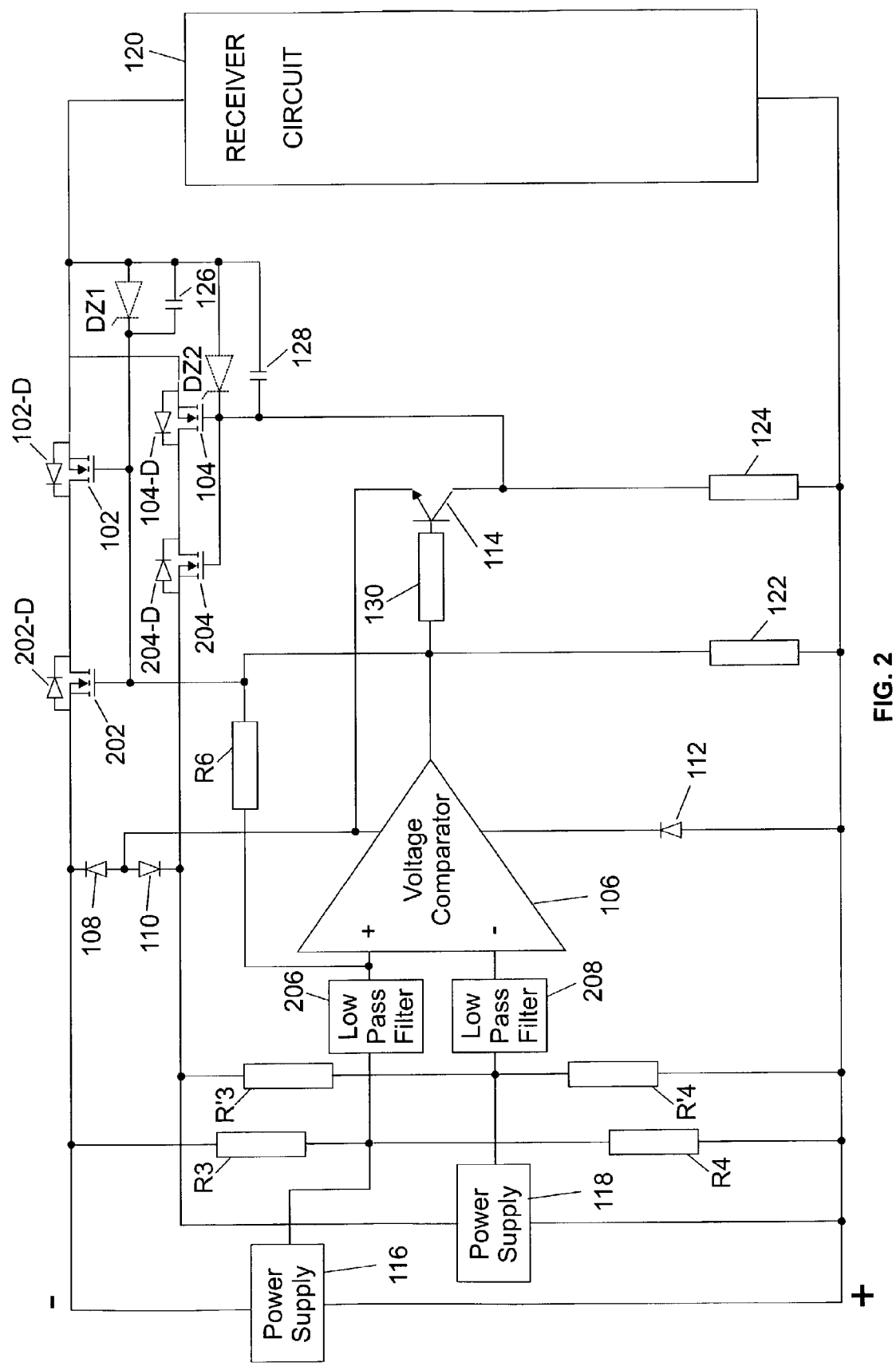
FIG. 2 is a block diagram of a second embodiment of the present invention.

Referring now to FIG. 2, a second embodiment of the invention is described. For ease of description, the same elements shown in FIG. 1 are referenced by the same numbers and only new elements have new references. FIG. 2 illustrates a redundant power supply switching system having four transistor switches 102, 104, 202 and 204, made of the already described first and second control switches 102 and 104 and of first and second isolation switches 202 and 204. In a preferred embodiment, a low pass filter (206,208) is connected at each input of the voltage comparator 106 to limit the number of switchings at the comparator's output, thereby limiting the transistors' switchings.

The switches are preferably four N-channel MOSFET transistors. The source electrode of first isolation switch 202 is connected to the low voltage terminal of first power supply 116 while the source electrode of second isolation switch 204 is connected to the low voltage terminal of second power supply 118. The drain electrode of first isolation switch 202 is connected to the drain electrode of first control switch 102 while the drain electrode of second isolation switch 204 is connected to the drain electrode of second control switch 104. The isolation switches are thus connected in a conventional manner.

In this second embodiment, the gate of the first control switch and the gate of the first isolation switch are connected to the output of the voltage comparator and to the base of the inverter transistor 114 through resistor 130. The emitter of inverter 114 is connected to the lowest terminal of either power source 116 or 118 through diodes 108 and 110, while its collector is connected to the gate of the second control switch 104 and to the gate of the second isolation switch 204.

In steady state, assuming the first power supply 116 presents a greater potential difference between its terminals than the second power supply 118, then as described above, the output of the comparator is pulled high and the first control and isolation switches 102, 202 are in a conducting state while the second control and isolation switches 104, 204 are in a non-conducting state. First power supply 116 is connected to the receiver via the two 'On' resistances of first control and isolation switches 102, 202 while second power supply 118 is isolated from the receiver by the two intrinsic diodes (104-D, 204-D) of second control and isolation switches 104, 204. These diodes are connected with a common cathode and isolate second power supply 118 from the receiver and from first power supply 116 regardless of the direction of the current.

Assuming that a disturbance occurring on the first power supply 116 involves the low voltage of the first power supply becoming greater than the voltage of the low voltage terminal of the second power supply 118, the disturbance is then filtered at the comparator's inputs. As a consequence, depending on the duration and voltage of the disturbance, either the comparator's output remains tied up to a logical "1", or switches after a certain delay induced by the filter.

In either case, the second control switch 104 and the first isolation switch 202 remain in a non-conducting state, at least during this delay. Additionally, no current flows from first power supply 116 to second power supply 118 via the drain-to-source resistances 'Ron' of first control and isolation switches 102 and 202 and via the intrinsic diode 104-D of second control switch 104 because the intrinsic diode 204-D of second isolation switch 204 does not conduct. It will be appreciated that the drop voltage across the first control and isolation switches 102 and 202, when they are fully enhanced, remains still lower than the voltage across a forwardly biased diode and typically is less than 100 mV.

Furthermore, as will be apparent to one skilled in the art, a drain-to-source resistance 'Ron' of a MOSFET transistor is very low when fully enhanced and the power dissipated in the MOSFET is negligible compared to the power losses in a diode. However, the receiver is protected against polarity reversal by the mechanism described earlier, which is not impacted in this embodiment.

Another advantage of the present invention is that the gate of first isolation switch 202 and second isolation switch 204 is controlled gradually. In fact, capacitor 126 and capacitor 128 charges through resistor 122 and resistor 124, respectively, when the transistors switch from a non-conducting state to a conducting one, which provides an inrush current limiter to the receiver during power-on. This is particularly true for networking applications. With current technologies, to fully enhance a MOSFET transistor, the gate-to-source voltage should be in the range of 10V to 15V and the nominal supply voltage is preferably about 48V for networking applications.

In this case the gates of first and second isolation switches 202 and 204 are pulled high by charging capacitor 126 through resistor 122 and charging capacitor 128 through resistor 124. The gate voltage of first and second isolation switches 202 and 204 is clamped to a voltage in the range of 10V to 15V respectively by the already mentioned Zener diodes DZ1 and DZ2. Instead of rising to 48V, the gate voltage of each transistor will only reach 10V to 15V (a little bit less than one third of the final voltage). As is well known, in this range the charge of a capacitor through a resistor is almost linear and thus provides an efficient and inexpensive inrush current limiter.

Figure 3:
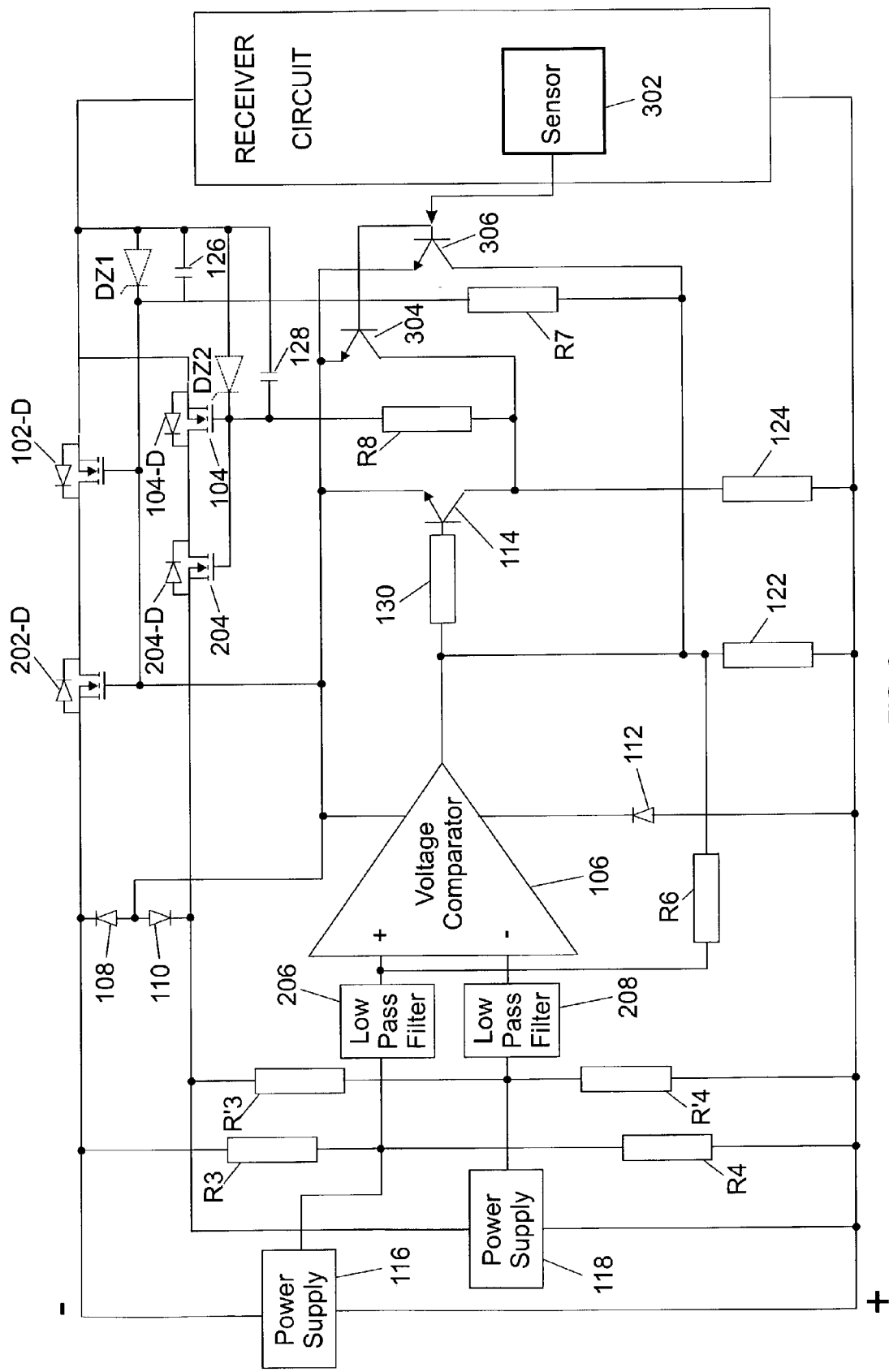
FIG. 3 is a block diagram of a third embodiment of the present invention.

Referring now to FIG. 3, a block diagram of a third embodiment of the present invention is described. Again, the same reference numbers are applied to common elements between FIGS. 1, 2 and 3 and new numbers reference only new elements. FIG. 3 illustrates the case where the receiver is disconnected from the power supply. A disconnection line is added to the respective gates of first and second isolation switches 202 and 204. A sensor circuit 302 is coupled to the receiver to provide a sensing signal when the receiver starts to be unplugged while its supply input terminals are still in contact with at least both terminals of first or second power supply 116 or 118.

The output of the sensor drives the base of two disconnection transistors 304 and 306. Both emitters of transistors 304 and 306 are connected to the lowest terminal of first or second power supplies 116 or 118 through the arrangement of diodes 108 and 110. In a preferred embodiment, a first resistor R7 is connected between the output of the voltage comparator 106 and the gate of the first switch devices (102,202), and a second resistor R8 is connected between the collector of the inverter 114 and the gate of the second switch devices (104,204). When the receiver is fully inserted within the power supply terminals, both disconnection transistors 304 and 306 are in a non-conducting state. When the receiver begins to be removed from power supply terminals, inverter 114 and disconnection transistor 304 are saturated.

When the first power supply 116 is coupled to the receiver and the receiver is removed from its power supply terminal, then the first control switch 102 and the first isolation switch 202 are in a conducting state while the second control switch 104 and the second isolation switch 204 are in a non-conducting state. Then the sensor 302 drives to a high voltage the base of the disconnection transistors 304 and 306. This creates a discharge path for capacitor 126 through first resistor R7 while capacitor 128 was already discharged by transistor 114 because the receiver is coupled to the first power supply 116. The gate of first control switch 102 and the gate of first isolation switch 202 are both driven low gradually while second control switch 104 and second isolation switch 204 are still in a non-conducting state. The drain-to-source resistances 'Ron' respectively of first control switch 102 and of first isolation switch 202 increases gradually to become an open circuit. This feature avoids fast current transients on lines and reduces or eliminates disturbances like voltage surges on harness or arcing that damage the other receiver connected to the same power supplies or their power terminals.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

The invention claimed is:

1. A system for connecting a receiving circuit (120) to a first and a second power supply units (116, 118), each power supply unit having a high potential terminal and a low potential terminal to be respectively connected to a high potential terminal and a low potential terminal of the receiving circuit, the system comprising;
   a first control switch device (102), said first control switch device being connected in series between the first power supply unit (116) and the receiving circuit (120);
   a second control switch device (104), said second control switch device being connected in series between the second power supply unit (118) and said receiving circuit (120);
   comparison means (106, 108, 110, 112) having a first input and a second input respectively coupled to said first power supply unit and to said second power supply unit to select said first or said second power supply unit as having the higher difference of potential between its respective high and low voltage terminals, and to output a corresponding high or low level;
   controlling means (114) connected to said first and second control switch devices to close either said first or said second control switch device based on the high or low level of the comparison means;
   a first isolation switch device (202) being connected in series between said first power supply and said first control switch device;
   and a second isolation switch device (204) being connected in series between said second power supply and said second control switch device;
   wherein said first and second isolation switch devices being gated by the output of said comparison means.

2. The system of claim 1 wherein said first control switch device and said second control switch device are MOSFET transistors, the first MOSFET transistor having a first intrinsic diode (102-D) forwardly biased from said first power supply unit to said receiving unit, and the second MOSFET transistor having a second intrinsic diode (104-D) forwardly biased from said second power supply unit to said receiving unit.

3. The system of claim 2 wherein said first control switch device is closed when said first power supply unit is selected.

4. The system of claim 2 wherein said second control switch device is closed when said second power supply unit is selected.

5. The system of claim 2 wherein said first and second control switch devices are closed when said first and second power supply units are connected to said receiver with reversed polarity.

6. The system of claim 2 wherein said comparison means further comprises a voltage comparator having an hysteresis device arrangement (R6).

7. The system of claim 6 wherein said controlling means further comprises a bipolar transistor having its base connected to the gate of said first control switch device and its collector connected to the gate of said second control switch device.

8. The system of claim 7 further comprising resistive means (130) connected between the output of said comparison means and said controlling means.

9. The system of claim 8 further comprising a (RC) charge path (122, 124, 126, 128) coupled to each of said first and second control switch devices.

10. The system of claim 9 further comprising a protection device coupled to the (RC) charge path.

11. The system of claim 10 wherein said controlling means further comprises a bipolar transistor having its emitter connected to the lowest potential terminal of said first and second power supply units.

12. The system of claim 11 further comprising low pass filter means (206,208) connected at the input of said comparison means.

13. The system of claim 12 further comprising sensing means (302) coupled to the receiving means to generate a sensing signal when said receiving means is being disconnected.

14. The system of claim 13 further comprising disconnection means (304,306,R7,R8) coupled to said controlling means to input the sensing signal.

15. The system of claim 14 wherein said first and second control switch devices, said first and second isolation switch devices are MOSFET transistors, and wherein said first and second isolation MOSFET transistors have respectively a first isolation intrinsic diode (202-D) back biased from said first power supply unit to said receiving unit, and a second isolation intrinsic diode (204-D) back biased from said second power supply unit to said receiving unit.

16. The system of claim 1 wherein said controlling means further comprises a bipolar transistor having its emitter connected to the lowest potential terminal of said first and second power supply units.

17. The system of claim 1 wherein said comparison means further comprises a voltage comparator having a hysteresis device arrangement (R6);
   wherein said controlling means further comprises a bipolar transistor having its base connected to the gate of said first control switch device and its collector connected to the gate of said second control switch device; and
   resistive means (130) connected between the output of said comparison means and said controlling means.

18. The system of claim 17 further comprising a (RC) charge path (122, 124, 126, 128) coupled to each of said first and second control switch devices.

* * * * *